United States Patent
Ohta et al.

(10) Patent No.: US 8,716,972 B2
(45) Date of Patent: May 6, 2014

(54) MOTOR CONTROL APPARATUS AND METHOD FOR CONTROLLING MOTOR

(75) Inventors: Seitaro Ohta, Kitakyushu (JP); Jun Hagihara, Kitakyushu (JP); Takeshi Arimatsu, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 371 days.

(21) Appl. No.: 13/289,061

(22) Filed: Nov. 4, 2011

(65) Prior Publication Data

US 2012/0229069 A1    Sep. 13, 2012

(30) Foreign Application Priority Data

Mar. 8, 2011 (JP) ................... 2011-050367

(51) Int. Cl.
  *G05B 19/29* (2006.01)
(52) U.S. Cl.
  USPC ............................ 318/601; 318/430; 318/431
(58) Field of Classification Search
  USPC ................... 318/601, 696, 685, 430, 431
  See application file for complete search history.

(56) References Cited

U.S. PATENT DOCUMENTS 6,555,987 B2 * 4/2003 Leenhouts .................... 318/696

FOREIGN PATENT DOCUMENTS

JP    06-195118    7/1994

* cited by examiner

*Primary Examiner* — Karen Masih
(74) *Attorney, Agent, or Firm* — Ditthavong Mori & Steiner, P.C.

(57) ABSTRACT

A motor control apparatus includes a power converter, a speed controller, and a stop position controller. The power converter outputs a current to drive a motor based on a torque command. The speed controller generates the torque command based on an error between a speed command of the motor and a speed of the motor. The stop position controller calculates an acceleration command to output a predetermined torque after detection of a reference position per revolution of a position detector for a first time during speed control of the motor, generates a torque feed-forward command based on the acceleration command, generates a position command based on the acceleration command, and generates the speed command based on an error between the position command and the motor position to execute position control of the motor.

20 Claims, 4 Drawing Sheets

_US 8,716,972 B2_

MOTOR CONTROL APPARATUS AND METHOD FOR CONTROLLING MOTOR

CROSS-REFERENCE TO RELATED APPLICATIONS

The present application claims priority under 35 U.S.C. §119 to Japanese Patent Application No. 2011-050367, filed Mar. 8, 2011. The contents of this application are incorporated herein by reference in their entirety.

BACKGROUND OF THE INVENTION

1. Field of the Invention

The present invention relates to a motor control apparatus and a method for controlling a motor.

2. Discussion of the Background

Japanese Unexamined Patent Application Publication No. 6-195118 discloses a stop position control apparatus to execute stop position control. The stop position control apparatus includes a speed controller, a stop position speed command operator, a stop position speed command switch, and a speed command switch. The speed controller executes feedback control of the current speed in response to an input speed command. The stop position speed command operator generates a stop position speed command that is proportionate to the square root of a position error between the target position and the current position. The stop position speed command switch changes its output, based on the current speed and the current position, to either a predetermined stop position commencing speed command or a command input from the stop position speed command operator. The speed command switch forwards an external speed command to the speed controller during speed control, while forwarding the output of the stop position speed command switch as the speed command to the speed controller during stop position control.

The stop position control apparatus is described as executing stop position control using the stop position speed command operator, which generates a stop position speed command that is proportionate to the square root of a position error. In this respect, the torque is different from the kind of torque conveniently selected by a user.

SUMMARY OF THE INVENTION

According to one aspect of the present invention, a motor control apparatus includes a power converter, a speed controller, and a stop position controller. The power converter is configured to output a current to drive a motor based on a torque command. The speed controller is configured to generate the torque command based on an error between a speed command of the motor and a motor speed of the motor. The stop position controller is configured to calculate an acceleration command to output a predetermined torque after detection of a reference position per revolution of a position detector for a first time during speed control of the motor. The position detector is configured to detect a motor position. The stop position controller is configured to generate a torque feed-forward command based on the acceleration command. The torque feed-forward command is to be added to the torque command. The stop position controller is configured to generate a position command based on the acceleration command. The position command is indicative of the reference position detected for the first time relative to a target stop position of the motor. The stop position controller is configured to generate the speed command based on an error between the position command and the motor position to execute position control of the motor.

According to another aspect of the present invention, a method for controlling a motor includes, in response to input of a stop commencing command to stop the motor, controlling a speed of the motor to a detectable speed at which a reference position of a position detector is detectable. The position detector is configured to detect a position of the motor. A position of the motor is controlled to stop the motor at a predetermined target stop position, in response to detection of the reference position for a first time after an error between the detectable speed and the speed of the motor is smaller than a predetermined value. The controlling step of the position of the motor includes outputting a predetermined torque to the motor for a predetermined period of time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
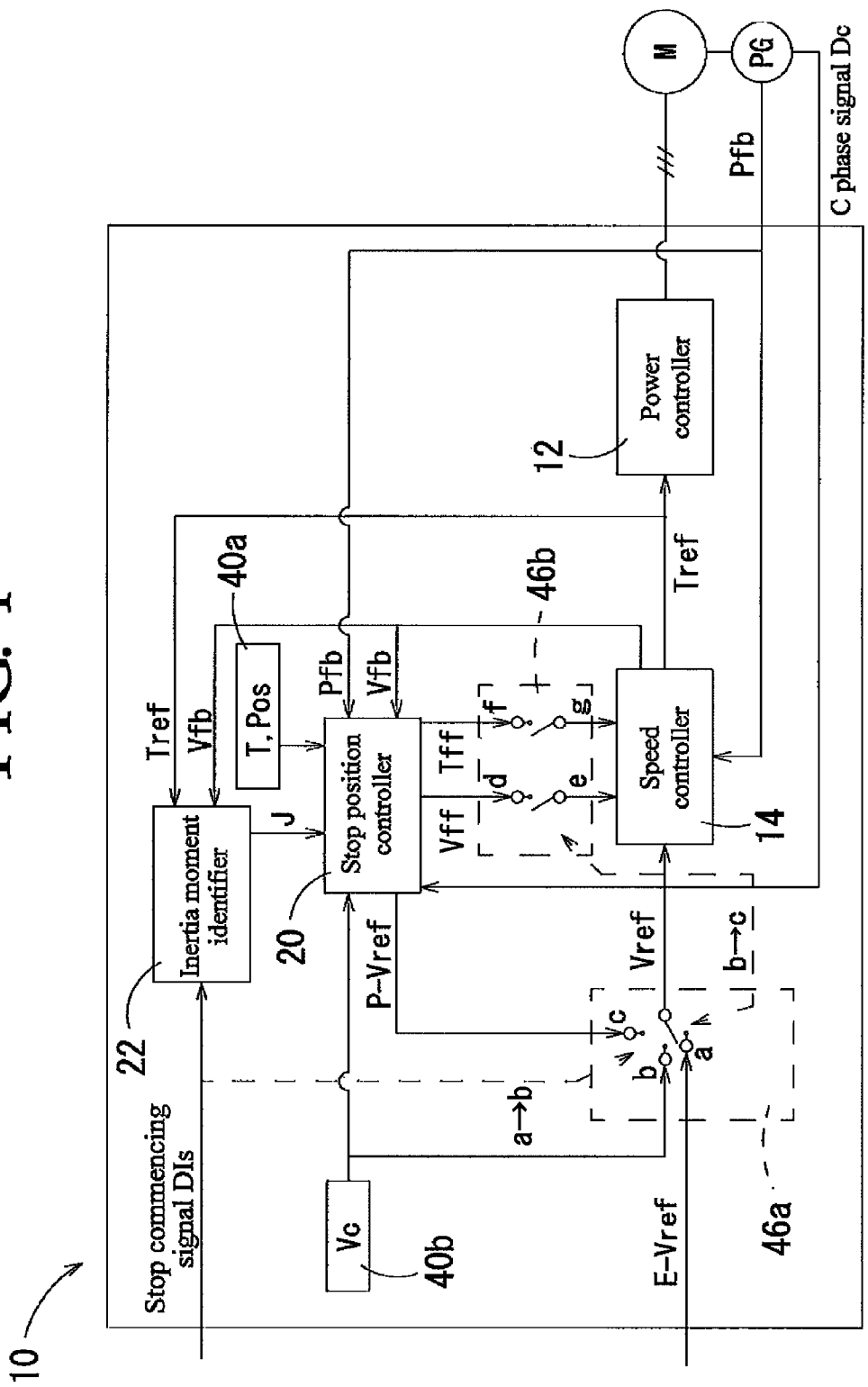
FIG. 1 is a functional block diagram of a motor control apparatus according to an embodiment.

The embodiments will now be described with reference to the accompanying drawings, wherein like reference numerals designate corresponding or identical elements throughout the various drawings.

As shown in FIG. 1, a motor control apparatus 10 according to an embodiment includes a power converter 12, a speed controller 14, a stop position controller 20, and an inertia moment identifier 22. The motor control apparatus 10 is able to control a motor M attached with a position detector PG. The motor M with the position detector PG is, for example, a servo motor used to drive a main shaft of a machine tool.

The power converter 12 outputs a current for driving the motor M based on a torque command Tref.

Figure 2:
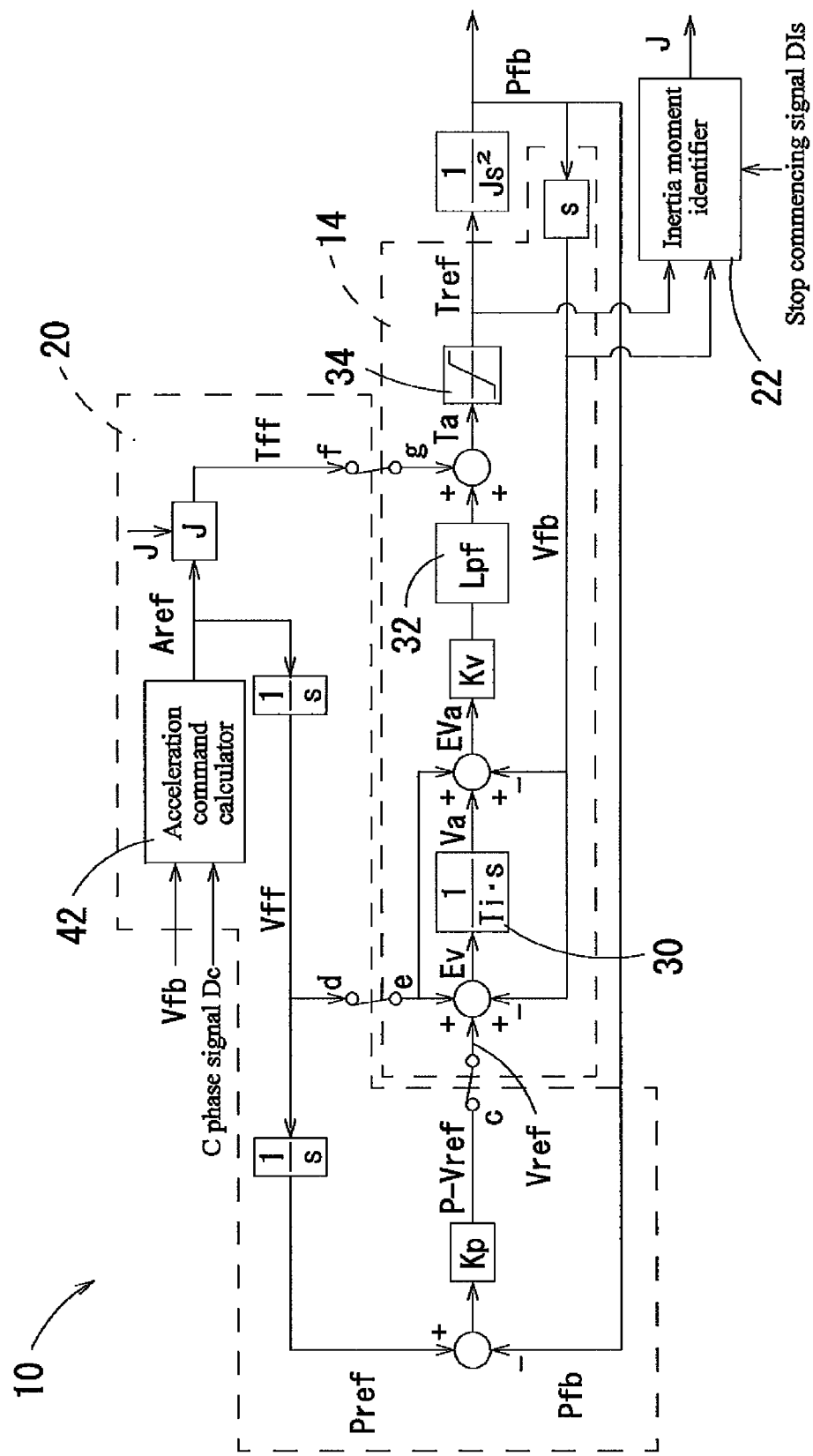
FIG. 2 is a control block diagram of the motor control apparatus executing position control.

The speed controller 14 generates the torque command Tref based on a motor speed command Vref, a position Pfb of the motor M (motor position), and a speed feed-forward command Vff and a feed-forward command Tff that are generated by the stop position controller 20. Specifically, as shown in FIG. 2, the speed controller 14 adds the speed feed-forward command Vff to an error between the speed command Vref and the speed of the motor M (the motor speed) Vfb, which is a differential of the motor position (position feedback) Pfb, thus obtaining a value Ev. The speed controller 14 integrates the obtained value Ev at an integrator 30 having an integration time constant Ti, thus obtaining a speed Va. The speed controller 14 adds the speed feed-forward command Vff to an error between the speed Va and the motor speed (speed feedback) Vfb, thus obtaining a value Eva. The speed controller 14 multiplies the obtained value Eva by a speed loop gain Kv and removes the high-frequency components through a lowpass filter 32. The speed controller 14 adds the torque feed-forward command Tff to the output of the lowpass filter 32, thus obtaining a torque Ta, and limits the torque Ta using a torque limiter 34, thus generating the torque command Tref.

The stop position controller 20 generates a) a speed command P-Vref, b) a torque feed-forward command Tff, and c) a speed feed-forward command Vff based on 1) a torque T, a target stop position Pos, and a speed command Vc, 2) an inertia moment J, 3) a motor speed Vfb, 4) a motor position Pfb, and 5) a C phase signal Dc. The torque T and the target stop position Pos of 1) are predetermined by the user. The speed command Vc of 1) enables detection of a reference position (C phase signal Dc) per revolution of the position detector PG. The inertia moment J of 2) is an inertia moment of a controlled object, including an inertia moment of the rotor of the motor M. The torque T and the target stop position Pos are stored in a memory 40a, while the speed command Vc is stored in a memory 40b.

The torque T, which is set by the user, may be set at a maximum torque Tmax of the motor M. It should be noted, however, that the term "maximum torque Tmax" is not the maximum torque in a strict sense. Specifically, the "maximum torque" means an "approximately maximum torque", which allows for tolerance (this applying throughout the description that follows). The speed command Vc may be set at a maximum speed at which the C phase signal Dc is detectable. It should be noted, however, that the term "maximum speed" is not the maximum speed in a strict sense. Specifically, the "maximum speed" means an "approximately maximum speed", which allows for tolerance (this applying throughout the description that follows).

More specifically, as shown in FIG. 2, the stop position controller 20 includes an acceleration command calculator 42 to calculate, in response to input of the C phase signal Dc, an acceleration command Aref based on the motor speed Vfb. The stop position controller 20 multiplies the acceleration command Aref, which is calculated by the acceleration command calculator 42, by the inertia moment J, thus generating the torque feed-forward command Tff. The stop position controller 20 integrates the acceleration command Aref, thus generating the speed feed-forward command Vff. The stop position controller 20 also integrates the generated speed feed-forward command Vff, thus generating a position command Pref, and multiplies an error between the position command Pref and the motor position Pfb by a position loop gain Kp, thus generating the speed command P-Vref.

The inertia moment identifier 22 identifies the inertia moment J of a controlled object, including the inertia moment of the rotor of the motor M. Specifically, in response to input of a stop commencing signal (stop commencing command) DIs, the inertia moment identifier 22 identifies the inertia moment J based on the torque command Tref and the motor speed Vfb using, for example, the following formula.

$$J = Tref/(s \times Vfb) \quad \text{Formula (1)}$$

where s denotes a Laplace operator.

When the inertia moment J is known in advance, the inertia moment identifier 22 may be omitted.

As shown in FIG. 1, the motor control apparatus 10 further includes a switch 46a and a coupler 46b. The switch 46a switches the speed command Vref, which is input to the speed controller 14, among at least 1) a speed command P-Vref that is generated by the stop position controller 20, 2) a speed command E-Vref that is input from an upper controller, not shown (such as a programmable logic controller), and 3) the speed command Vc, at which the reference position (the C phase signal Dc) per revolution of the position detector PG is detectable. The speed command P-Vref is an exemplary first speed command. The speed command E-Vref is an exemplary second speed command. The speed command Vc is an exemplary third speed command. When the stop commencing signal DIs is input, the switch 46a switches the node from the node a to the node b shown in FIG. 1 in order to switch the speed command Vref from the speed command E-Vref to the speed command Vc. When the C phase signal Dc is input, the switch 46a switches the node from the node b to the node c shown in FIG. 1 in order to switch the speed command Vref from the speed command Vc to the speed command P-Vref.

When the C phase signal Dc is input, the coupler 46b couples the node d and the node f respectively to the node e and the node g in order to input the torque feed-forward command Tff and the speed feed-forward command Vff, which are generated by the stop position controller 20, into the speed controller 14.

Figure 3:
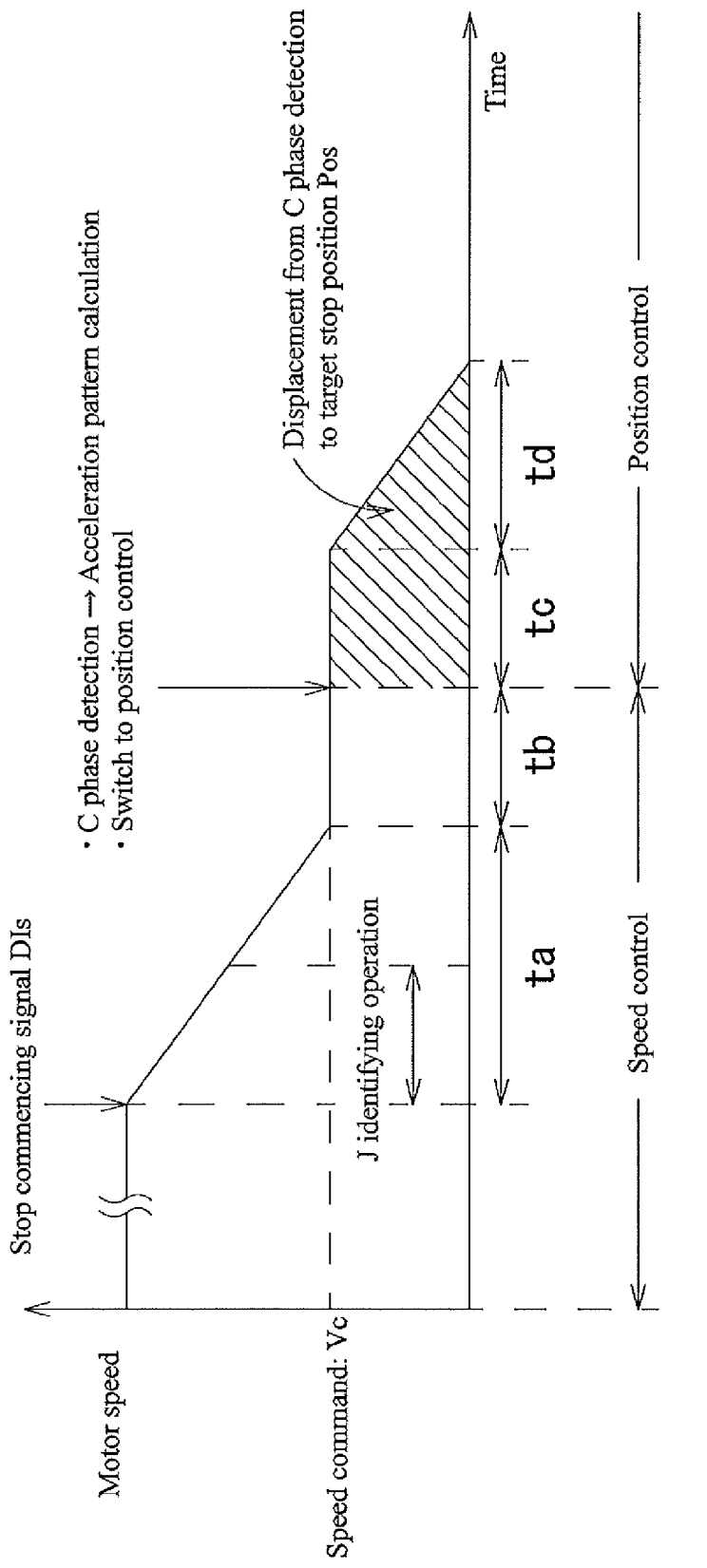
FIG. 3 is a speed-time graph of a motor that is controlled by the motor control apparatus.

Next, description will be given with respect to an operation of the motor control apparatus 10 (with respect to a method for controlling the motor). The operation described below is implemented by software executed by a CPU (not shown) of the motor control apparatus 10. Referring to FIG. 3, an operation of the motor control apparatus 10 will be described with respect to periods ta to td, which are after the stop commencing signal DIs is input while the motor M is under speed control to follow the speed command E-Vref input from the upper controller.

Period ta

The period ta is a period of time that extends between the point of time when the stop commencing signal DIs is input and the point of time when the motor speed Vfb matches the speed command Vc, at which the reference position (C phase signal Dc) per revolution of the position detector PG is detectable (for example, the maximum speed at which the C phase signal Dc is detectable). The phrase "the motor speed Vfb matches the speed command Vc" does not mean a strict match, but means an approximate match (this applying throughout the description that follows). Specifically, all that is necessary is that the motor speed Vfb be within a predetermined range of tolerance. A non-limiting example of the tolerance is 5% below and above the speed command Vc. In response to input of the stop commencing signal DIs, the switch 46a switches the speed command Vref of the speed controller 14 from the speed command E-Vref to the speed command Vc (from the node a to the node b in FIG. 1). As a result, the motor M commences to decelerate. Meanwhile, the inertia moment identifier 22 commences identification operations for the inertia moment J, to identify the inertia moment J within the period ta.

Period tb

The period tb is a period of time that extends between the point of time when the motor speed Vfb matches the speed command Vc and the point of time when the reference position (C phase signal Dc) per revolution of the position detector PG is detected for the first time. During the period tb, the motor control apparatus 10 executes the speed control of the motor M using the speed command Vref as the speed command Vc. The motor M is subjected to speed control until the period tb ends.

Period tc

The period tc is a period of time (first period of time) that extends between the point of time (point of time Tm1) when the reference position (C phase signal Dc) per revolution of the position detector PG is detected for the first time and the point of time (point of time Tm2) when the motor M outputs the predetermined torque T. In response to the first detection of the C phase signal Dc, the switch 46a switches the speed command Vref of the speed controller 14 from the speed command Vc to the speed command P-Vref, which is generated by the stop position controller 20 (switches the node from the node b to the node c in FIG. 1). Also in response to the first detection of the C phase signal Dc, the coupler 46b couples the node d and the node f respectively to the node e and the node g in order to input the torque feed-forward command Tff and the speed feed-forward command Vff, which are generated by the stop position controller 20, into the speed controller 14.

As a result, when the period tb elapses and the period tc begins, the control of the motor M is transitioned from the speed control to the position control. At the transition from the speed control to the position control, the initial value of the speed feed-forward command Vff is determined to ensure an approximate match in magnitude between the speed feed-forward command Vff and the motor speed Vfb. For example, the initial value of the speed feed-forward command Vff is set at Vc. The initial value of the position command Pref is determined to ensure an approximate match in magnitude between the position command Pref and the motor position Pfb. For example, the initial value of the position command Pref is set at 0, since when the C phase signal Dc is detected, the control of the motor M is transitioned to the position control. The integral value of the integrator 30 in the speed controller 14 immediately before the transition from the speed control to the position control is cleared so as to reduce an impact (discontinuity of the motor speed) associated with the transition. This maintains the continuity of the motor speed at the time of the transition from the speed control to the position control within an allowable range. During the period tc, the motor M operates while maintaining the same motor speed as the speed command Vc based on the speed command P-Vref generated by the stop position controller 20. A method for generating the speed command P-Vref by the stop position controller 20 will be described later.

Period td

The period td is a period of time (second period) that extends between the point of time (point of time Tm2) when the motor M outputs the predetermined torque T and the point of time (point of time Tm3) when the motor M stops at the target stop position Pos (predetermined stop position Pos). During the period td, the motor M outputs the predetermined torque T (such as the maximum torque Tmax) based on the speed command P-Vref generated by the stop position controller 20. A method for generating the speed command P-Vref by the stop position controller 20 will be described later. After elapse of the period td, the position control continues so as to maintain the motor M at the target stop position Pos.

Next, description will be given with respect to a method for generating the speed command P-Vref by the stop position controller 20 in the period tc and the period td. Upon detection of the C phase signal Dc, the acceleration command calculator 42 of the stop position controller 20 calculates the period tc and the period td and generates the acceleration command Aref for each of the calculated period tc and the calculated period td. First, the acceleration command calculator 42 calculates the period tc based on the following formula.

$$tc = Pos/Vc - JVc/(2 \times T) \quad \text{Formula (2)}$$

where Pos denotes the target stop position (rad), Vc denotes the speed command (rad/s), with which the reference position (C phase signal Dc) per revolution of the position detector is detectable, J denotes the inertia moment (kgm$^2$), and T denotes the predetermined torque (Nm) of the motor.

When tc is less than 0, $2\pi$ is added to the target stop position Pos to make a new target stop position Pos.

Next, the acceleration command calculator 42 calculates the period td based on the following formula.

$$td = J \times Vc/T \quad \text{F(3)}$$

The acceleration command calculator 42 then calculates the acceleration command Aref for each of the calculated period tc and the calculated period td based on the following formula.

$$\text{Period } tc: Aref = 0 \quad \text{F(4)}$$

$$\text{Period } td: Aref = -T/J \quad \text{F(5)}$$

Figure 4:
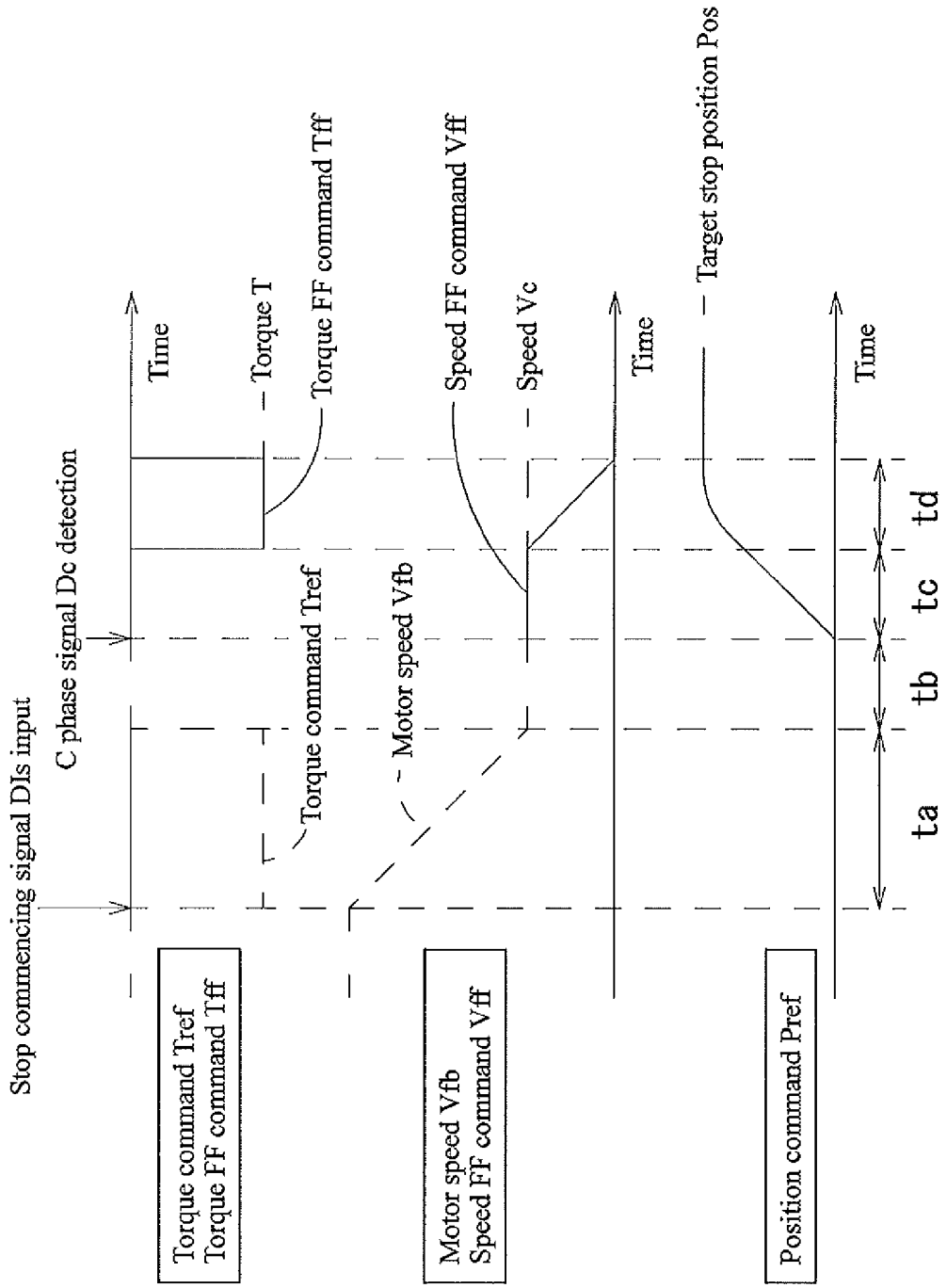
FIG. 4 is a time chart of a torque feed-forward command, a speed feed-forward command, and a position command of the motor control apparatus.

As the solid line of FIG. 4 indicates, the stop position controller 20 multiplies the acceleration command Aref by the inertia moment J, thus generating the torque feed-forward command Tff. The stop position controller 20 integrates the acceleration command Aref, thus generating the speed feed-forward command Vff, and integrates the generated speed feed-forward command Vff, thus generating the position command Pref. That is, along the displacement of the motor M from the point of detection of the C phase signal Dc (the shaded area in FIG. 3) to the target stop position Pos, the motor M during the period tc travels at the speed at the time of detection of the C phase signal Dc, while during the period td, the motor M outputs the predetermined torque T to travel to the target stop position Pos. The dashed lines of the FIG. 4 denote the torque command Tref and the motor speed Vfb in the period to and the period tb.

Thus, after detection of the reference position (C phase signal Dc) per revolution of the position detector PG, which detects the motor position Pfb, for the first time during the speed control of the motor M, the stop position controller 20 generates 1) the torque feed-forward command Tff, which is to be added to the torque command Tref to generate the predetermined torque T, and 2) the position command Pref, which is indicative of the reference position detected for the first time relative to the target stop position Pos of the motor M based on the torque feed-forward command Tff. The stop position controller 20 generates the speed command P-Vref based on the error between the position command Pref and the motor position Pfb to control the position of the motor M.

As has been described hereinabove, in this embodiment, the motor M outputs the predetermined torque T to stop at the target stop position Pos. In view of this, for example, the user may set the speed command Vc at the allowable maximum speed and set the torque T at the maximum torque Tmax of the motor M. This reduces the time required for the motor M to stop at the target stop position Pos as compared with cases with the speed command Vc and the torque T set otherwise.

The above-described embodiment should not be construed in a limiting sense; any modifications are possible without changing the scope of the present invention. For example, any combination of a part or a whole of the embodiment and modifications thereof will be encompassed within the scope of the present invention. While in the embodiment the speed feed-forward command Vff generated by the stop position controller 20 is input into the speed controller 14, the speed feed-forward command Vff is not necessarily input into the speed controller 14.

The influence of variation in the inertia moment J may be compensated in the course of identifying the inertia moment J by, for example, eliminating an estimated disturbance based on information on the torque and speed of the motor using a disturbance observer. The compensation makes further more appropriate the torque feed-forward command Tff, the speed feed-forward command Vff, and the position command Pref.

In the embodiment, in response to input of the stop commencing signal DIs, the motor M starts to decelerate to match its speed with the speed command Vc. Alternatively, when the motor speed Vfb is lower than the speed command Vc at the time of input of the stop commencing signal DIs, the motor M may start to accelerate to match its speed with the speed command Vc.

The stop position controller 20 may first generate the position command Pref and differentiate the position command Pref, thus generating the speed feed-forward command Vff. The stop position controller 20 may then differentiate the generated speed feed-forward command Vff and multiply the differential by the inertia moment J, thus generating the torque feed-forward command Tff. Thus, the stop position controller 20 generates the speed feed-forward command Vff and the torque feed-forward command Tff based on the position command Pref. This reduces the position error (position misalignment) of the motor position Pfb relative to the target stop position Pos.

In the embodiment, the position control system of the stop position controller 20 and the speed control system of the speed controller 14 have been described in the context of a position-proportional and speed-integral-proportional control system (P-IP control). Other examples of the control system include, but not limited to, a position-proportional and speed-proportional-integral control system (P-PI control), and a position-proportional and speed-proportional control system (P-P control).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A motor control apparatus comprising:
a power converter configured to output a current to drive a motor based on a torque command;
a speed controller configured to generate the torque command based on an error between a speed command of the motor and a motor speed of the motor; and
a stop position controller configured to: calculate an acceleration command to output a predetermined torque after detection of a reference position per revolution of a position detector for a first time during speed control of the motor, the position detector being configured to detect a motor position; generate a torque feed-forward command based on the acceleration command, the torque feed-forward command being to be added to the torque command; generate a position command based on the acceleration command, the position command being indicative of the reference position detected for the first time relative to a target stop position of the motor; and generate the speed command based on an error between the position command and the motor position to execute position control of the motor.

2. The motor control apparatus according to claim 1,
wherein the speed command used by the speed controller comprises at least one of a first speed command, a second speed command, and a third speed command, the first speed command being generated by the stop position controller, the second speed command being output from an upper controller, the third speed command comprising a predetermined speed command,
wherein a stop commencing command with respect to the target stop position is input into the motor control apparatus while the speed controller executes the speed control of the motor in accordance with the second speed command, and the speed controller is configured to execute the speed control of the motor in accordance with the third speed command in place of the second speed command, and
wherein the stop position control apparatus is configured to execute the position control of the motor using the first speed command and the torque feed-forward command after the first detection of the reference position.

3. The motor control apparatus according to claim 2, wherein the predetermined speed command comprises a speed command at which the reference position is detectable.

4. The motor control apparatus according to claim 2,
wherein the predetermined speed command comprises an approximately maximum speed command at which the reference position is detectable, and
wherein the torque comprises an approximately maximum torque of the motor.

5. The motor control apparatus according to claim 2, wherein the stop position controller is configured to calculate the acceleration command based on the torque and an inertia moment of a controlled object, the inertia moment including an inertia moment of the motor, and configured to generate the torque feed-forward command based on the acceleration command.

6. The motor control apparatus according to claim 5, wherein the stop position control apparatus is configured to execute double integral of the acceleration command to generate the position command.

7. The motor control apparatus according to claim 5,
wherein a period of time between a point of time Tm1 at which the reference position is detected for the first time and a point of time Tm3 at which the motor stops at the target stop position comprises a first period of time and a second period of time, the first period of time extending between the point of time Tm1 and a point of time Tm2 at which the motor outputs the torque, the second period of time extending between the point of time Tm2 and the point of time Tm3, and
wherein the stop position controller is configured to calculate the first period of time based on the target stop position, the third speed command, and the torque, and configured to calculate the second period of time based on the inertia moment, the third speed command, and the torque.

8. The motor control apparatus according to claim 5, further comprising an inertia moment identifier configured to identify the inertia moment.

9. The motor control apparatus according to claim 1, wherein the stop position controller is configured to execute single integral of the acceleration command to generate the speed feed-forward command, and configured to add the speed feed-forward command to at least the speed command.

10. The motor control apparatus according to claim 3, wherein the stop position controller is configured to calculate the acceleration command based on the torque and an inertia moment of a controlled object, the inertia moment including an inertia moment of the motor, and configured to generate the torque feed-forward command based on the acceleration command.

11. The motor control apparatus according to claim 4, wherein the stop position controller is configured to calculate the acceleration command based on the torque and an inertia moment of a controlled object, the inertia moment including an inertia moment of the motor, and configured to generate the torque feed-forward command based on the acceleration command.

12. The motor control apparatus according to claim 10, wherein the stop position control apparatus is configured to execute double integral of the acceleration command to generate the position command.

13. The motor control apparatus according to claim 11, wherein the stop position control apparatus is configured to execute double integral of the acceleration command to generate the position command.

14. The motor control apparatus according to claim 6,
wherein a period of time between a point of time Tm1 at which the reference position is detected for the first time and a point of time Tm3 at which the motor stops at the target stop position comprises a first period of time and a second period of time, the first period of time extending between the point of time Tm1 and a point of time Tm2 at which the motor outputs the torque, the second period of time extending between the point of time Tm2 and the point of time Tm3, and wherein the stop position controller is configured to calculate the first period of time based on the target stop position, the third speed command, and the torque, and configured to calculate the second period of time based on the inertia moment, the third speed command, and the torque.

15. The motor control apparatus according to claim 10,
wherein a period of time between a point of time Tm1 at which the reference position is detected for the first time and a point of time Tm3 at which the motor stops at the target stop position comprises a first period of time and a second period of time, the first period of time extending between the point of time Tm1 and a point of time Tm2 at which the motor outputs the torque, the second period of time extending between the point of time Tm2 and the point of time Tm3, and wherein the stop position controller is configured to calculate the first period of time based on the target stop position, the third speed command, and the torque, and configured to calculate the second period of time based on the inertia moment, the third speed command, and the torque.

16. The motor control apparatus according to claim 11,
wherein a period of time between a point of time Tm1 at which the reference position is detected for the first time and a point of time Tm3 at which the motor stops at the target stop position comprises a first period of time and a second period of time, the first period of time extending between the point of time Tm1 and a point of time Tm2 at which the motor outputs the torque, the second period of time extending between the point of time Tm2 and the point of time Tm3, and wherein the stop position controller is configured to calculate the first period of time based on the target stop position, the third speed command, and the torque, and configured to calculate the second period of time based on the inertia moment, the third speed command, and the torque.

17. The motor control apparatus according to claim 12,
wherein a period of time between a point of time Tm1 at which the reference position is detected for the first time and a point of time Tm3 at which the motor stops at the target stop position comprises a first period of time and a second period of time, the first period of time extending between the point of time Tm1 and a point of time Tm2 at which the motor outputs the torque, the second period of time extending between the point of time Tm2 and the point of time Tm3, and wherein the stop position controller is configured to calculate the first period of time based on the target stop position, the third speed command, and the torque, and configured to calculate the second period of time based on the inertia moment, the third speed command, and the torque.

18. The motor control apparatus according to claim 13,
wherein a period of time between a point of time Tm1 at which the reference position is detected for the first time and a point of time Tm3 at which the motor stops at the target stop position comprises a first period of time and a second period of time, the first period of time extending between the point of time Tm1 and a point of time Tm2 at which the motor outputs the torque, the second period of time extending between the point of time Tm2 and the point of time Tm3, and wherein the stop position controller is configured to calculate the first period of time based on the target stop position, the third speed command, and the torque, and configured to calculate the second period of time based on the inertia moment, the third speed command, and the torque.

19. The motor control apparatus according to claim 6, further comprising an inertia moment identifier configured to identify the inertia moment.

20. A method for controlling a motor, the method comprising:
in response to input of a stop commencing command to stop the motor, controlling a speed of the motor to a detectable speed at which a reference position of a position detector is detectable, the position detector being configured to detect a position of the motor, and controlling a position of the motor to stop the motor at a predetermined target stop position, in response to detection of the reference position for a first time after an error between the detectable speed and the speed of the motor is smaller than a predetermined value, the controlling step of the position of the motor comprising outputting a predetermined torque to the motor for a predetermined period of time.

\* \* \* \* \*